(12) United States Patent
Andersen et al.

(10) Patent No.: US 6,277,420 B1
(45) Date of Patent: Aug. 21, 2001

(54) COMBINATION RAWHIDE AND FORMULATED FOOD PET CHEW

(76) Inventors: David B. Andersen, 286 Coronia Ave., Long Beach, CA (US) 90803-1821; Richard L. Harpe, 8712 Bellmead Dr., Huntington Beach, CA (US) 92646

( * ) Notice: Subject to any disclaimer, the term of this patent is extended or adjusted under 35 U.S.C. 154(b) by 0 days.

(21) Appl. No.: 09/478,642

(22) Filed: Jan. 6, 2000

Related U.S. Application Data
(60) Provisional application No. 60/114,465, filed on Jan. 11, 1999.

(51) Int. Cl.$^7$ ................................ A23L 1/31; A23L 1/317
(52) U.S. Cl. ........................ 426/92; 426/138; 426/573; 426/577; 426/578; 426/641; 426/654; 426/657; 426/658; 426/807
(58) Field of Search ................ 426/92, 138, 573, 426/577, 578, 641, 657, 654, 658, 807

(56) References Cited

U.S. PATENT DOCUMENTS

| | | | |
|---|---|---|---|
| 2,988,045 | * 6/1961 | Fisher | 119/29 |
| 3,899,607 | 8/1975 | Miller et al. | 426/285 |
| 4,260,635 | 4/1981 | Fisher | 426/3 |
| 4,276,311 | * 6/1981 | Burrows et al. | 426/56 |
| 4,364,925 | 12/1982 | Fisher | 424/50 |
| 4,508,741 | * 4/1985 | Corbett et al. | 426/303 |
| 4,702,929 | 10/1987 | Lehn et al. | 426/635 |
| 4,771,733 | 9/1988 | Axelrod | 119/29.5 |
| 4,868,002 | 9/1989 | Scaglione et al. | 426/641 |
| 4,921,714 | 5/1990 | Matthews et al. | 426/90 |
| 5,026,572 | 6/1991 | Neilberger | 426/641 |
| 5,047,231 | 9/1991 | Spanier et al. | 424/57 |
| 5,186,124 | 2/1993 | Woodford | 119/29 |
| 5,200,212 | 4/1993 | Axelrod | 426/2 |
| 5,240,720 | 8/1993 | Axelrod | 426/2 |
| 5,290,584 | 3/1994 | Ray | 426/637 |
| 5,339,771 | 8/1994 | Axelrod | 119/710 |
| 5,635,237 | 6/1997 | Greenberg et al. | 426/646 |
| 5,673,653 | 10/1997 | Sherrill | 119/709 |
| 5,695,797 | 12/1997 | Geromini et al. | 426/62 |

* cited by examiner

*Primary Examiner*—Chhaya D. Sayala
(74) *Attorney, Agent, or Firm*—Paul M. Denk

(57) ABSTRACT

A highly palatable and long lasting dog chew for pets has been developed by combining a formulation and processing sequence which results in a highly palatable meat based filling being incorporated into the center of a preformed rawhide stick or rawhide roll. Such outside rawhide fraction is extremely tough and chewy which results in a dog chew which takes a long period of time for the dog to consume. The inside meat filling is highly palatable which results in the animal maintaining interest in the treat until nearly the entire chew has been consumed. The interior meat filling is preserved by reduced water activity to below 0.85 as a result of incorporating of salt, sugars and natural humectants. Said filling is formulated and processed in such a manner that the water phase is bound within the filling and does not pass by capillary action to the outside rawhide fraction. This results in the outer rawhide shell maintaining a tough and chewable texture until such point as the dog is offered the finished chew.

14 Claims, 2 Drawing Sheets

COMBINATION RAWHIDE AND FORMULATED FOOD PET CHEW

CROSS-REFERENCE TO RELATED APPLICATION

This application is a utility patent application upon the provisional patent application filed on Jan. 11, 1999, under Ser. No. 60/114,465, of the same inventors.

BACKGROUND OF THE INVENTION

This invention identifies a product and a process for producing an improved, highly palatable and long lasting rawhide chew for pets.

DESCRIPTION OF THE PRIOR ART

For years, there has been available a wide range of chew toys and chew treats for dogs and cats. The majority of the commercial interest lies in such products for dogs. These have been composed of both natural products and synthetic products. The two major requirements for such products are that they be at least somewhat palatable to the pets in order to maintain their interest and that they last a long time or have an extended "chew-life".

In the area of synthetic products, toys such as rubber balls have been utilized for many years. A wide range of synthetic products based on rubber, nylon, plastic and polyurethane have been offered in numerous shapes with moderate success.

More natural products have recently achieved a wider share of the chew market. These include jerky type products, which in their early stages were very tough and achieved a long "chew-life". In recent years, the jerky type products have been made utilizing emulsified meats and reforming processes. Such products tend to be more fragile than the early jerky which was simply dried beef muscle tissue. The reformed products can be consumed instantly by even small dogs and are no longer considered "chews".

Natural products made from animal body parts have become popular in the marketplace. These include dried, smoked pig ears, tails, hoofs and bones. Also, a wide assortment of products is being made from rawhide. Such products can be made utilizing both sliced and dried rawhide as well as by chop and reform techniques. The main problem with rawhide has been that basic rawhide is not particularly palatable and dogs loose interest in the product after a relatively short time. Manufacturers have attempted to overcome this by coating or basting the rawhide with flavorings, but these are usually applied on the surface and are quickly licked off by the dog.

As indicated above, the challenge from the standpoint of product development is to achieve an acceptable chew from the point of palatability but still have an extended "chew-life". The bulk of the prior art has involved addressing the palatability and "chew-life" characteristics.

As indicated above, early pet food jerky that was made by dehydrating low fat beef muscle tissue was highly palatable and could provide a reasonable "chew life" if sliced and dried in thick strips. Attempts have been made to toughen reformed jerky products to improve the "chew life". Neilberger (U.S. Pat. No. 5,026,572) disclosed a multiple extrusion method of producing jerky by extruding a blend of wet beef and flour and then incorporating the cooked product of this first extrusion into a second extrusion step. Ray (U.S. Pat. No. 5,290,584) teaches the utilization of frozen mechanically separated meats that are comminuted to a small particle size and then mixed with pregelatinized flour prior to elevated temperature extrusion. Scaglione (U.S. Pat. No. 4,868,002) describes a process for making a tougher jerky using fibrous components of animal tissue or plant tissue such as wheat straw, alginates or industrial generated fibers.

Many long-lasting synthetic chews have been developed in attempts to address the "chew-life" issue. Axelrod (U.S. Pat. No. 4,771,733) discloses a method whereby an aqueous based flavor or odor is incorporated into a polyurethane resin based dog chew to improve the palatability of the product. Axelrod attempted further improvements to this technology (U.S. Pat. No. 5,339,771) by dispersing an animal meal within the matrix of a synthetic thermoplastic molded bone. Axelrod also discloses (U.S. Pat. No. 5,240,720) an injection molded chew produced from rennet casein and gelatin which can be heated by the consumer in a microwave oven to cause the chew to expand and thereby render it more easily chewable.

In the rawhide area, Sherrill (U.S. Pat. No. 5,673,653) has attempted to solve the difficulty of low palatability of rawhide by wrapping sheets of rawhide with sheets of beef jerky superimposed on each other. The sheets are then wrapped into a roll and dehydrated by conventional methods to form a flavored rawhide chew containing a dehydrated beef fraction. While this teaching does improve the flavor of rawhide, many of the volatiles containing a significant portion of the flavoring are evaporated during the dehydration step. A second shortcoming of this process is that many highly palatable ingredients such as sugars cannot easily be incorporated in the process. Also, the final product will contain a very high percentage of rawhide fraction as compared to meat fraction further reducing the acceptability.

Fisher (U.S. Pat. No. 4,260,635) describes a method of producing shredded rawhide and molding said rawhide with edible ingredients such as cereals, dried meat and collagen based binders into a chew product. A multilayer type product is identified by layering portions of fibrous product described above with portions of product molded without the use of said shredded fibers. This product has the disadvantage of containing low levels of meat fraction as well as evaporation of the highly palatable volatile flavors during dehydration.

Lehn (U.S. Pat. No. 4,702,929) developed a method for grinding tannery waste material called spetches, mixing same together with a starch material and passing through several heating zones and a die plate; whereupon the extruded pieces were cut into a "chew" size treat. Such extruded product was then dehydrated to form an edible chew. While flavoring could be formulated into the mix prior to extrusion, the end product was primarily a homogenous dehydrated blend of rawhide fraction and starch binder. Spanier (U.S. Pat. No. 5,047,231) describes a method for preparing a rawhide chew suitable for use with dogs to prevent tartar accumulation. Such chew is produced by treating the hide with at least one inorganic pyrophosphate compound and dehydrating.

Greenberg (U.S. Pat. No. 5,635,237) teaches a method utilizing a twin screw extruder to reform small scraps of rawhide into a single homogenous unit. Greenberg does suggest that coloring or flavoring can be incorporated by external application to improve the palatability. While it is also suggested that through the use of two extruders, a soft filling could be incorporated into the center of an outer shell, such filling is expected to contain substantially all rawhide possibly flavored with a jerky fraction and softeners such as propylene glycol.

Other attempts have been made to utilize combinations of different ingredients utilizing coextrusion techniques to mix a softer more palatable phase with a more chewy less palatable phase. Matthews (U.S. Pat. No. 4,921,714) discloses a triple coextrusion technique to stuff a meat product into a casing with separate filling and fat phases that are pumped independently into the casing. Another coextruded product, this one in the shape of a bone was disclosed by Miller (U.S. Pat. No. 3,899,607) in which the outside of the matrix is a formulated simulated bone and the inner portion contains a simulated "marrow" filling which is soft and stabilized by a high level of food grade humectant.

An additional teaching similar to the rawhide processes, is that of Woodford (U.S. Pat. No. 5,186,124) which discloses a process whereby shark skin with a small quantity of meat remaining is cut into strips and dehydrated to yield a leathery chew designated primarily for cats.

Other prior art known to applicants include the U.S. Pat. No. 5,200,212 to Axelrod, and the U.S. Pat. No. 4,364,925 to Fisher.

SUMMARY OF THE INVENTION

The objective of the present invention is to create a rawhide chew for dogs that is more palatable than the existing rawhide based products. It is further an object of the present invention to create the above improved palatability with little or no loss in the "chew life" of the product. It is the object of this invention to accomplish the above improvements by utilizing the advantages of the long lasting rawhide fraction in conjunction with the palatability advantages of a high meat intermediate moisture filling.

The chew of the present invention is composed of an outer shell of natural or reformed rawhide in conjunction with an inner cylinder of shelf-stable meaty filling. The natural or reformed rawhide of the present invention is first formed by preparing round rolls of wet rawhide and dehydrating such rolls in a manner as to have a hole through the center of the rawhide roll of such diameter as to hold the desired amount of highly palatable meaty filling. As an alternative, a reformed rawhide stick can be formulated from chopped or ground rawhide by extruding or pressing through a die in such a manner as to produce an extruded stick of the desired size with a hole in the middle of sufficient diameter to hold the desired amount of filling.

In the present invention, the holes through the center of the rawhide sticks or rolls are filled with a shelf stable meaty filling and processed in such a way as to cause the meaty filling to set into a firm gel and thus be firmly attached to the center of the rawhide chew.

In another aspect of the present invention, the shelf stable meaty filling that is incorporated into the rawhide stick or roll, is formulated in such a manner that moisture transfer by capillary action from the filling to the outside rawhide member is minimized. This results in an acceptable shelf-life where the inner meaty filling will remain soft and palatable and the outer rawhide shell will remain tough and chewy.

In yet another alternative, the present invention provides for a method of stuffing a shelf-stable preformed meat stick contained within an edible casing into the cavity in the center of the rawhide stick or roll.

These and other objects may become more apparent to those skilled in the art upon reviewing the summary of this invention, when studied in conjunction with the description of its preferred embodiment.

DESCRIPTION OF THE PREFERRED EMBODIMENTS

Figure 1:
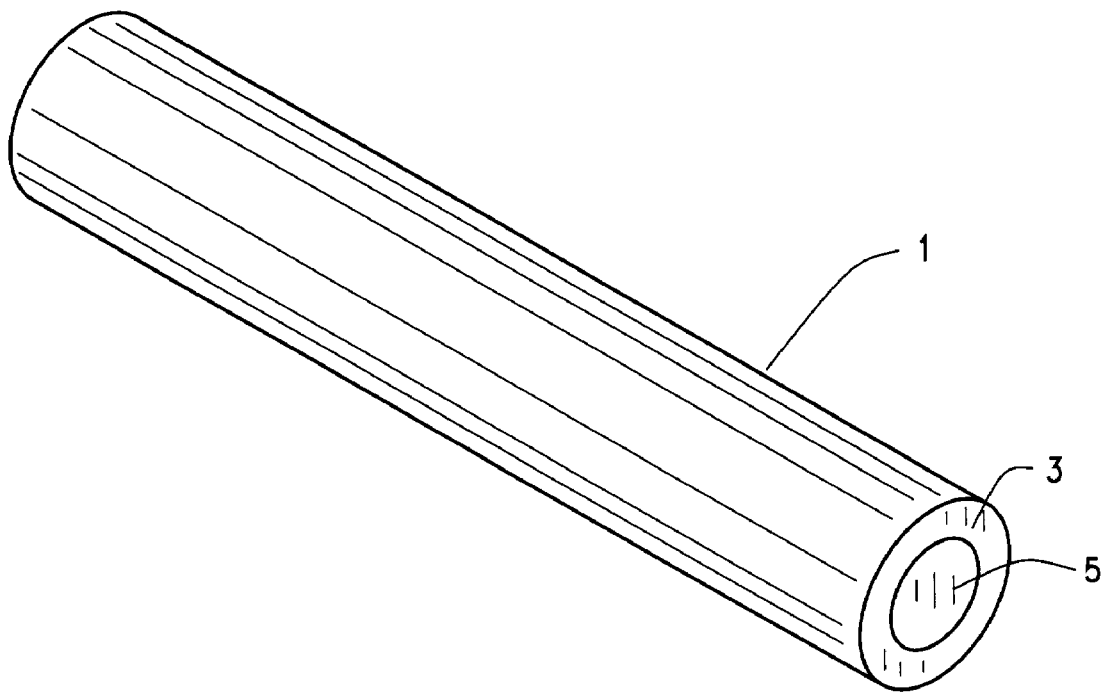
FIG. 1 provides an isometric view of the combination rawhide and formulated food pet chew, of this invention.
Figure 2:
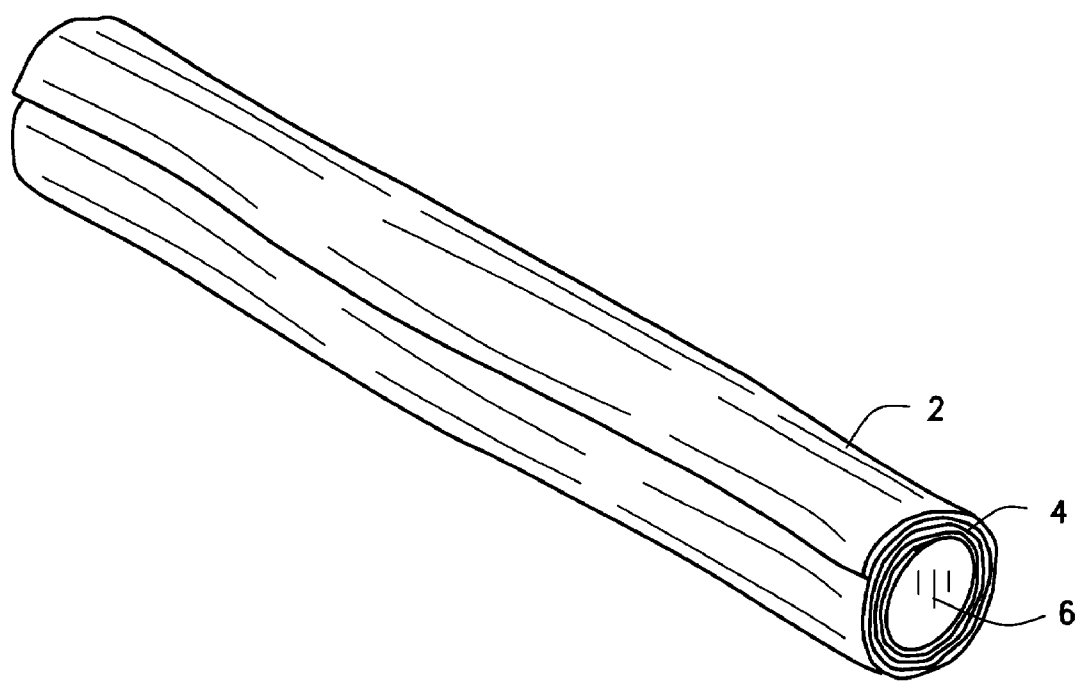
FIG. 2 is an isometric view of a similar type of pet chew, but wherein its outer rawhide covering is convolutely wound thereon.

In the present invention, the initial step is the manufacture of the base rawhide chew as indicated in FIGS. 1 and 2. FIG. 1 shows the extruded or pressed form of the ground rawhide 1, and FIG. 2 shows the rolled form 2 of the product. The raw starting material can be beef hide, cow hide, water buffalo hide or any similar starting material. Both rawhide rolls and extruded or pressed rawhide sticks similar to FIGS. 1 and 2, except without the cavity, have been manufactured for years by numerous suppliers and the basic manufacturing procedures are well known to those skilled in the art. The procedure is modified for this process by the manufacture of the product with the hollow center, as at 3 and 4. In the case of the rawhide rolls, this is done by wrapping the wet cured rawhide around a form followed by dehydration at typical processing temperatures until the rolls have a moisture level below about 8% moisture. In the case of the extruded rawhide sticks, the formation of a hollow center is achieved by extruding through a round die with a pin in the center to form the hole in the finished stick. The formed sticks are extruded moist and also dried to a moisture level below about 8%.

The length and diameter of the sticks or rolls can be determined to a great extent by marketing preference. Typically, however, the overall length will range between 4" and 12", with a 6" length found to be about the optimum desired length for the end consumer. The diameter can also vary within a wide range of about ½" to about 2", with a preferred diameter of about 1½". The diameter of the hollow center is also at the discretion of the marketer, but to some extent this is limited by a desire to keep the wall of the rawhide fraction thick enough to make it difficult for the dog to break through too easily, thus maintaining a long "chew-life". In the case of extruded sticks, we have found it beneficial to maintain a wall thickness of ¼" to ½". In the case of the rawhide rolls, we have found it beneficial from the standpoint of toughness to have at least two full wraps of rawhide around the circumference of the roll. This will usually result in a hole diameter of approximately ½" to ¾" on a roll of 1½" O.D. with a minimum of two wraps of rawhide.

The ratio of rawhide to merely filling can be varied in order to control both the toughness of the product and the overall palatability. As the percentage of rawhide portion increases, the roll or stick will become harder and the "chew life" will increase. As the portion of meaty filling increases, the palatability of the product will increase substantially. We have found that with the extruded stick, the rawhide portion can range from about 50% to about 75% and the meaty filling from about 25% to about 50%. The preferred range is about 65% rawhide and 35% filling. With the roll product, we have found the rawhide portion can range from about 25% to about 50% and the meaty filling from about 50% to about 75%. We have found the most acceptable combination of toughness and animal acceptance at about 33% rawhide and 67% meaty filling.

Several factors must be taken into consideration in the formulation and processing of the filling. The protein or meaty fillings can be seen at 5 and 6, respectively. In order to achieve the desired palatability, a portion of fresh meat, dehydrated meat, meat by-product, or meat flavoring should be formulated into the matrix. We have found that a competitive product can be produced with a meat fraction ranging from 2% to 50%. Preferably, a fresh meat fraction of 25–30% or a dehydrated meat fraction of 5–10% has been found to be the most effective.

In addition, a sweetener or combination of sweeteners should be incorporated to serve as a further palatability enhancer and also help to reduce the water activity of the meaty filling. We have found that a sweetener level of 10–40% (dry weight basis) will accomplish the two desired effects. The sweeteners can be selected from a wide range of available ingredients and include sucrose, corn syrup, dextrose, fructose, rice syrup and molasses, among others.

We have found that a superior product will also include a humectant such as glycerol, propylene glycol or sorbitol. Such humectant serves to further reduce the water activity as well as slow down the tendency of such a product to dry out over an extended market life of more than one year. It is also advantageous to add salt at a level of 0 to about 4% to further improve the palatability and also assist in the reduction of water activity. Preservatives such as fungicides, an example of is potassium sorbate, and antioxidants such as natural tocopherols may also be incorporated in order to further extend the shelf-life of the product.

A further embodiment of this invention involves the necessity to bind the moisture fraction within the meaty filling and prevent or significantly slow the transfer of moisture from the filling portion to the outside rawhide portion. This is accomplished by utilizing specific ingredients and process systems to bind the water in the filling phase and thus reduce capillary transfer of moisture to the outer phase. These same moisture binding agents have the effect of thickening the meaty filling so that the interior fraction clings to the inside surface of the rawhide and makes it necessary for the animal to exert considerable chewing action to reach the highly palatable inner core.

Figure 3:
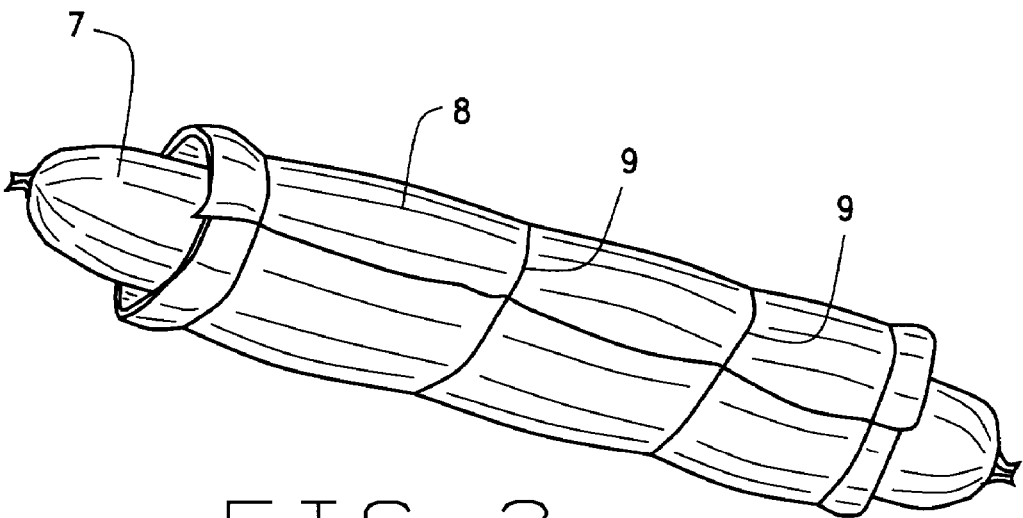
FIG. 3 is an isometric view of the processed meat or protein product, embodied within its casing, and having an alternative rawhide wrap provided around its exterior.

FIG. 3 discloses the meaty filling of this invention, and which may be formulated in the manner of the various examples as provided herein, but obviously, that meaty filling can be formulated from any of a variety of emulsified ground, or other forms of beef, pork, lamb, or any variety of meats, or combination of beef and byproducts of the packing house, and which will be shaped into the configuration of the center cores 5 and 6, as previously explained, or which can be filled into a food grade type of casing, as known in the art. As disclosed in FIG. 3, the meat or protein filling 7 is stuffed within a rawhide casing 8, and the casing may be tied by means of a series of strands, as can be seen at 9, to hold the rawhide into position, at least initially, and until it becomes dried and hardened.

Figure 4:
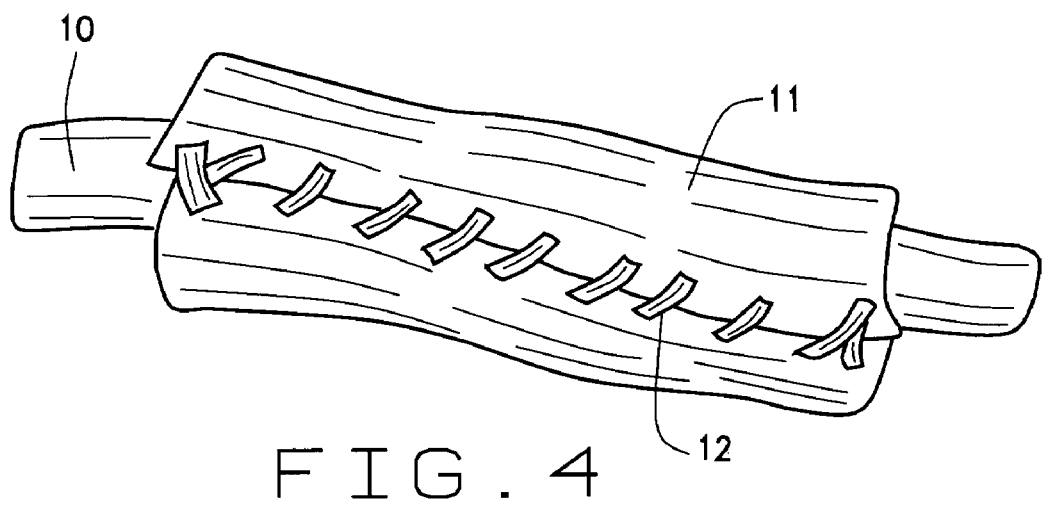
FIG. 4 is an isometric view of a meaty filling having a rawhide wrap surrounding the same and stitched, in the manner of a shoe lace, into an enclosure.

FIG. 4 discloses a similar type meat or protein filling 10, and which has a rawhide casing 11 wrapped therearound, and which can be tied, or closed in the manner of a shoelace, as noted, as at 12, into a wrapped configuration, around the filling, by means of any type of gut, leather strip, or the like.

Figure 5:
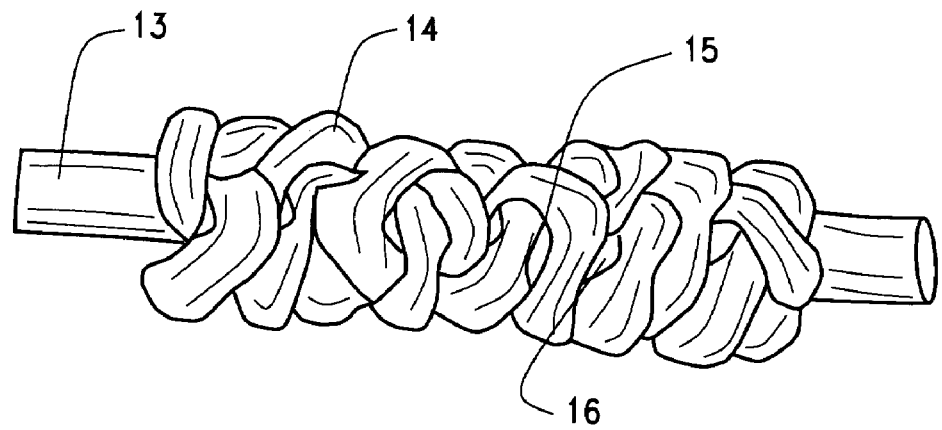
FIG. 5 is an isometric view of a meat or protein filling having the alternative of braided rawhide strips surrounding the same.

FIG. 5 discloses a meat or protein filling 13, and which has strips of rawhide, as at 14 and 15, in any number of strips, braided therearound to get the configuration and appearance as shown in said figure. This is further to add to the attractiveness of the product, and to appeal to the appetite of the dog, particularly since it may be able to view certain segments of the meat filling, as can be seen at 16, through the disclosed braided casing.

We have identified three alternative approaches to "gelling" the meaty or protein filling within the rawhide cavity. In a preferred embodiment, the filling is prepared and cooked in a liquid flowable state to a temperature sufficiently high to create a soluble homogeneous system of the meaty filling components. Such liquid filling is then deposited into the rawhide sticks or rolls that have previously been plugged at one end and aligned in a vertical position with the plugged end at the base. The rawhide sticks or rolls are maintained in this vertical position until the meaty filling has set into a soft gel and thus remains attached to the inside wall of the rawhide fraction. The following Example therefore is set forth as illustrative of this invention:

EXAMPLE 1

A liquid meaty slurry is prepared containing the following ingredients:

| INGREDIENT | % BY WEIGHT |
| --- | --- |
| Emulsified Beef or Protein | 10.0 ± |
| Agar | 1.5 |
| Water | 16.0 |
| Salt | 4.0 |
| 62 D.E. Corn Syrup | 39.0 |
| Potassium Sorbate | 0.3 |
| Glycerin | 4.0 |
| Onion Powder | 0.7 |
| Garlic Powder | 0.1 |
| Chickenmeal | 10.2 |
| Sugar | 10.0 |
| Chicken Fat | 4.0 |
| Citric Acid | 0.1 |
| Tween 80 | 0.1 |

The slurry was mixed in a steam jacketed kettle and heated to 205° F. in order to solubilize the agar. The still liquid material was then pumped to a piston filler and deposited into the cavity of vertical rawhide sticks and rolls that had been prepared as described above and temporarily capped on the bottom with a plastic overcap to prevent the meaty filling from draining out the bottom. The filled sticks were then run through an enclosed cooling tunnel and cooled to below 100° F. at which point the meaty filling set into a firm gel that was attached to the inside walls of the rawhide. The finished product was found to be extremely palatable to dogs and furthermore it took the majority of the dogs several minutes to chew through the filled compressed rawhide sticks and in most cases over an hour to chew through the filled rawhide rolls. The typical dog would maintain interest in the chew until it had been totally consumed. Shelf-life studies were conducted on the rolls and sticks made with this formulation. It was determined that even after six months of accelerated 100° F. storage that there had been no significant transfer of moisture from the internal meaty filling to the outside rawhide. The rawhide fraction remained tough and chewy even at the end of six months.

In an alternative preferred embodiment, the liquid meaty filling with a moisture binding component is added cold into the cavity of a reformed rawhide stick or rawhide roll. While maintained in a vertical position with a bottom cap seal to keep the meaty slurry within the rawhide, the sticks or rolls are passed through an oven or heat chamber to cause the filling to cook into a firm gel and when cooled will be "set" in such a manner that the moisture fraction will be bound within the filling portion. The following EXAMPLE is set forth as an alternative utilizing this preferred embodiment.

EXAMPLE 2

A liquid meat slurry is prepared utilizing the following ingredients:

| INGREDIENT | % BY WEIGHT |
|---|---|
| 62 D.E. Corn Syrup | 37.0 |
| Liquid Egg | 25.0 |
| Emulsified Beef | 9.8 |
| Sugar | 10.0 |
| Chicken meal | 5.0 |
| Glycerin | 4.0 |
| Chicken fat | 4.0 |
| Salt | 4.0 |
| Onion Powder | 0.7 |
| Potassium Sorbate | 0.3 |
| Citric Acid | 0.1 |
| Tween 80 | 0.1 |

The ingredients are mixed together at room temperature under moderate agitation to form a homogeneous slurry. The rawhide sticks or rolls are capped at one end and aligned vertically. A depositor is used to deposit the slurry into the cavity of the rawhide pieces. The product is then run through a conveyor oven with a sufficient time and temperature to cause the meat slurry to be heated to a temperature sufficiently high to cook the meat fraction and coagulate the egg. We have found the best results in terms of product firmness if the interior temperature is at least 180° F. The egg fraction serves as a binder to maintain the aqueous portion of the meaty filling in a bound state and prevent long-term migration of moisture to the rawhide shell. The meaty filling was found to have a water activity below 0.85 and thus be microbiologically stable. Long term stability testing of the finished rawhide chews showed no significant transfer of moisture from the meaty filling to the outer rawhide fraction even after a period of six months.

As a further preferred embodiment, a shelf stable meaty filling may be formed and cooked inside of an edible casing and such casing inserted into the cavity of a rawhide roll or reformed rawhide stick. Alternatively, with this embodiment, a rawhide sheet may be rolled around or sewed around circumference of the preformed meaty stick that has been formulated and processed in such a way that the moisture fraction within the said meaty casing will not transfer to the outer rawhide fraction. The following EXAMPLE is set forth as a description of the preferred embodiment of this alternative.

EXAMPLE 3

A meaty filling is prepared utilizing the following ingredients:

| INGREDIENT | % BY WEIGHT |
|---|---|
| Emulsified Beef Liver | 21.0 |
| 62 D.E. Corn Syrup | 17.0 |
| Chickenmeal | 17.0 |
| Soy Flour | 12.74 |
| Spray Dried Egg Albumin | 6.0 |
| Soy Grits | 5.0 |
| Chicken Fat | 5.0 |
| Salt | 4.0 |
| Glycerin | 4.0 |
| Water | 4.0 |
| Gelatin | 3.0 |
| Onion Powder | 0.5 |
| Garlic Powder | 0.1 |
| Potassium Sorbate | 0.3 |
| Smoke Flavor | 0.2 |
| Citric Acid | 0.1 |
| Tocopherol antioxident | 0.05 |
| F.D. & C Red #40 | 0.01 |

This formulation was mixed and stuffed into an edible collagen casing 21 mm in diameter. The sticks were then cooked in a conveyor oven at 225° F. with a retention time of 8 minutes. The long ropes were then cut into 6" long sticks. These sticks were then incorporated into the cavities of the rawhide rolls and sticks described in the earlier embodiments of this invention. This can be done by three alternative methods. The easiest is to simply insert the finished sticks into the rawhide cavities. A second alternative is to wrap wet rawhide sheets around the preformed sticks and dehydrate the combination product for such time and temperature parameters to reduce the moisture content of the rawhide fraction to about less than 8%. A product produced by this method is indicated in FIG. 3. A third alternative is to sew a wet sheet or rawhide around the preformed stick and dehydrate as indicated above. An example of this alternative is demonstrated in FIG. 4. It has been discovered that the combination product has a more pleasing appearance and is more easily accepted by dogs if the stick containing the meaty filling is allowed to overhang the rawhide member by about ¼" to ½" on each end.

Other ancillary ingredients may be added at the discretion of the formulator primarily for nutritional, palatability, or marketing considerations. These include vitamin and mineral supplements, flavorings and spices, colors, fiber components and other such ingredients.

A further example of a more generic fill of either meat or protein and which can be embodied or wrapped within the rawhide casing, of this invention, is set forth in the following example.

EXAMPLE 4

| INGREDIENT | % BY WEIGHT |
|---|---|
| Emulsified Beef or Protein | 10.00–40.00 |
| Corn, Sorghum, or other Syrup | 15.00–40.00 |
| Animal Fats | 2.00–7.00 |
| Salt | 3.00–5.00 |
| Glycerin | 3.00–5.00 |
| Water | 3.00–5.00 |

-continued

| INGREDIENT | % BY WEIGHT |
|---|---|
| Flavorings | 0.2–1.50 |
| Potassium Sorbate | 0.2–0.50 |
| Citric Acid | 0.1–0.20 |
| Miscible Agent | 0.1 |
| Food Coloring | 0.01 |

While specific embodiments of the invention have been described, those skilled in the art will recognize that a wide range of modifications could be accomplished within the framework of this invention. For example, various ingredients set forth in the examples, may be varied, changed, as required, for the particular mixture of meaty and protein products formulated as filling material. For example, a miscible agent, such as Tween, may not be required for a particular formulation, or food coloring may not be necessary, or even citric acid may not be required. These are just examples of where minor variations may be made to the formulations for these pet food products. Therefore, the variations or modifications to the subject matter of this invention may occurred to those skilled in the art upon reviewing the disclosure of this invention, and yet be within the scope of any claims allowed. The description of the preferred embodiments, and particularly as shown in the drawings, are set forth for illustrative purposes only.

We claim:

1. A chew for domestic and animals consisting of:
   a hollow outer fraction of natural or ground and recombined rawhide;
   said hollow outer fraction being one of an outer shell of rawhide, an extruded stick of rawhide having a hole provided in its middle and along its length, and rawhide strips braided into the configuration of a casing;
   said hollow outer faction being dehydrated to have a moisture content of about less than 8%;
   an inner fraction of shelf-stable meaty filling, said meaty filling having a water activity below about 0.85, so that said meaty filling is formulated and processed to eliminate or substantially reduce the migration of its water phase to the hollow outer rawhide faction;
   the ratio by volume of the rawhide portion to the meaty filling being 25%–75% to 75%–25% respectively; and
   wherein said water phase of the meaty filling contains the following ingredients in percentage by weight, as hereinafter provided:

| INGREDIENT | % BY WEIGHT |
|---|---|
| Emulsified Beef or Protein | 10.0 ± |
| Agar | 1.5 |
| Water | 16.0 |
| Salt | 4.0 |
| 62 D.E. Corn Syrup | 39.0 |
| Potassium Sorbate | 0.3 |
| Glycerin | 4.0 |
| Onion Powder | 0.7 |
| Garlic Powder | 0.1 |
| Chickenmeal | 10.2 |
| Sugar | 10.0 |
| Chicken Fat | 4.0 |
| Citric Acid | 0.1 |
| Tween 80 | 0.1. |

2. A chew for domestic and animals consisting of:
   a hollow outer fraction of natural or ground and recombined rawhide;
   said hollow outer fraction being one of an outer shell of rawhide, an extruded stick of rawhide having a hole provided in its middle and along its length, and rawhide strips braided into the configuration of a casing;
   said hollow outer faction being dehydrated to have a moisture content of about less than 8%;
   an inner fraction of shelf-stable meaty filling, said meat filling having a water activity below about 0.85, so that said meaty filling is formulated and processed to eliminate or substantially reduce the migration of its water phase to the hollow outer rawhide fraction;
   the ratio by volume of the rawhide portion to the meaty filling being 25%–75% to 75%–25% respectively; and
   wherein said water phase of the meaty filling contains the following ingredients in percentage by weight, as hereinafter provided:

| INGREDIENT | % BY WEIGHT |
|---|---|
| 62 D.E. Corn Syrup | 37.0 |
| Liquid Egg | 25.0 |
| Emulsified Beef | 9.8 |
| Sugar | 10.0 |
| Chicken meal | 5.0 |
| Glycerin | 4.0 |
| Chicken fat | 4.0 |
| Salt | 4.0 |
| Onion Powder | 0.7 |
| Potassium Sorbate | 0.3 |
| Citric Acid | 0.1 |
| Tween 80 | 0.1. |

3. A chew for domestic and animals consisting of:
   a hollow outer fraction of natural or ground and recombined rawhide;
   said hollow outer fraction being one of an outer shell of rawhide, an extruded stick of rawhide having a hole provided in its middle and along its length, and rawhide strips braided into the configuration of a casing;
   said hollow outer faction being dehydrated to have a moisture content of about less than 8%;
   an inner fraction of shelf-stable meaty filling, said meaty filling having a water activity below about 0.85, so that said meaty filling is formulated and processed to eliminate or substantially reduce the migration of its water phase to the hollow outer rawhide fraction;
   the ratio by volume of the rawhide portion to the meaty filling being 25%–75% to 75%–25% respectively; and
   wherein said water phase of the meaty filling contains the following ingredients in percentage by weight, as hereinafter provided;

| INGREDIENT | % BY WEIGHT |
|---|---|
| Emulsified Beef Liver | 21.0 |
| 62 D.E. Corn Syrup | 17.0 |
| Chickenmeal | 17.0 |
| Soy Flour | 12.74 |
| Spray Dried Egg Albumin | 6.0 |
| Soy Grits | 5.0 |
| Chicken Fat | 5.0 |

-continued

| INGREDIENT | % BY WEIGHT |
| --- | --- |
| Salt | 4.0 |
| Glycerin | 4.0 |
| Water | 4.0 |
| Gelatin | 3.0 |
| Onion Powder | 0.5 |
| Garlic Powder | 0.1 |
| Potassium Sorbate | 0.3 |
| Smoke Flavor | 0.2 |
| Citric Acid | 0.1 |
| Tocopherol antioxident | 0.05 |
| F.D. & C Red #40 | 0.01. |

4. A chew for domestic and animals consisting of:

a hollow outer fraction of natural or ground and recombined rawhide;

said hollow outer fraction being one of an outer shell of rawhide, an extruded stick of rawhide having a hole provided in its middle and along its length, and rawhide strips braided into the configuration of a casing;

said hollow outer faction being dehydrated to have a moisture content of about less than 8%;

an inner fraction of shelf-stable meaty filling, said meaty filling having a water activity below about 0.85, so that said meaty filling is formulated and processed to eliminate or substantially reduce the migration of its water phase to the hollow outer rawhide fraction;

the ratio by volume of the rawhide portion to the meaty filling being 25%–75% to 75%–25% respectively; and wherein said water phase of the meaty filling contains the following ingredients in percentage by weight, as hereinafter provided:

| INGREDIENT | % BY WEIGHT |
| --- | --- |
| Emulsified Beef or Protein | 10.00–40.00 |
| Corn, Sorghum, or other Syrup | 15.00–40.00 |
| Animal Fats | 2.00–7.00 |
| Salt | 3.00–5.00 |
| Glycerin | 3.00–5.00 |
| Water | 3.00–5.00 |
| Flavorings | 0.2–1.50 |
| Potassium Sorbate | 0.2–0.50 |

-continued

| INGREDIENT | % BY WEIGHT |
| --- | --- |
| Citric Acid | 0.1–0.20 |
| Miscible Agent | 0.1 |
| Food Coloring | 0.01. |

5. The process for forming a chew for domestic animals comprising:

forming a hollow outer fraction of natural or ground and recombined rawhide;

forming a central cavity through the hollow outer fraction;

pouring a meaty filling into the central cavity of the hollow outer fraction;

cooling said meaty filling until it sets into a meaty gel composed of an aqueous fraction that will not migrate into the hollow outer fraction.

6. The process of claim 5 including inserting said meaty filling into an edible casing prior to its being inserted into the hollow outer fraction.

7. The process of claim 6 and including braiding said hollow outer fraction around the meaty filling.

8. The process of claim 6 wherein the meaty filling is poured hot into the cavity of said rawhide piece and when cooled sets into a meaty gel composed of an aqueous fraction that will not migrate to the rawhide fraction.

9. The process of claim 6 and including pouring the meaty filling cold into the cavity of the hollow outer fraction, and subsequently heat setting said meaty filling into a meaty gel composed of an aqueous fraction that will not migrate into the rawhide fraction.

10. The process of claim 8 including adding liquid egg or dried egg solids to the meaty filling to provide for its heat set.

11. The process of claim 8, including adding modified food starch to the meaty filling to facilitate its heat set.

12. The process of claim 8 wherein adding a meat plasma to the meaty filling to provide for its heat set.

13. The process of claim 8 including the further step of adding calcium-alginate gel to the meaty filling to form a stable gel structure.

14. The process of claim 8 including adding pectin to the meaty filling to provide for its gelling.

\* \* \* \* \*